E. FOURNIER.
CLAMP HOOK.
APPLICATION FILED OCT. 12, 1911.
1,024,002.
Patented Apr. 23, 1912.
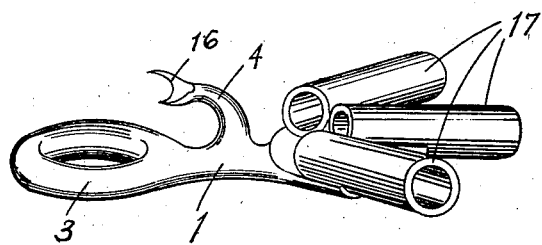
WITNESSES
INVENTOR
Emeric Fournier

UNITED STATES PATENT OFFICE.

EMERIC FOURNIER, OF SAN DIEGO, CALIFORNIA.

CLAMP-HOOK.

1,024,002.      Specification of Letters Patent.      Patented Apr. 23, 1912.

Application filed October 12, 1911. Serial No. 654,365.

*To all whom it may concern:*

Be it known that I, EMERIC FOURNIER, a citizen of the United States, residing at San Diego, in the county of San Diego and State of California, have invented a new and useful Clamp-Hook, of which the following is a specification.

This invention has relation to a clamp hook, its object being the provision of a simple and efficient device, adapted to automatically secure itself to a stake, rod, rope, or other object within the capacity of the single-looped end, and support other objects with the opposite end, the invention having the arrangement of parts and the several features and advantages herein specified, it being especially adapted to secure a series of ropes which are under a tension, as in the erection of tents, and, when in the reversed position with the supporting arm beneath the loop, it is well adapted for suspension purposes, and may be applied to the supporting means in the vertical, horizontal, and oblique positions, and without injury to the supporting object.

A preferred form of my invention is shown in the accompanying drawing, the figure being a perspective view of a hook having one end adapted for application to a smooth stake or similar object, and the other end adapted to secure a series of ropes thereto.

Referring more particularly to the drawing, body 1, has a loop 3, adapted to engage with a rod, stake, rope, or other means of support or suspension, and a series of cylindrical loops 17, radially arranged on the opposite end, which are particularly adapted to secure a series of ropes, the tension of which will cause the hook to bind firmly upon its supporting object, and a supporting arm 4, provided with a sharp edge 16, to engage with the supporting means, the said supporting arm forming a brace for the hook and supporting it at a substantially right angle to the object to which it may be attached.

From the foregoing description it will be seen that the device may be used for suspending articles from rods, bars, and the like, and also in the reversed position, for the erection of tents, and may be applied to the top of the tent pole and to the guy-rope stakes, and, while the elements shown and described are well adapted to serve the purposes for which they are intended, it is to be understood, that no limitation is made to the precise structural details exhibited in the drawing, but that changes, alterations, and modifications, which may fall within the scope of the claims, may be made if desired.

I claim:—

1. In a clamp hook, a body portion having cylindrical loops radially arranged thereon adapted to receive the ends of a series of ropes, an extension loop on one end of the body, and a supporting arm extending above said extension loop having an end conforming with said loop, substantially as set forth.

2. In a clamp hook, a body portion, a loop thereon adapted to engage with a suspension object, a supporting arm extending from the body adapted to bear against the suspension object and hold the hook at a substantially right angle thereto, and a series of cylindrical loops at the opposite end of the body adapted to receive and be secured to a series of rope-ends, substantially as set forth.

In testimony whereof, I affix my signature, in presence of two witnesses.

EMERIC FOURNIER.

Witnesses:
J. W. MASTER,
F. M. KEENEY.

Copies of this patent may be obtained for five cents each, by addressing the "Commissioner of Patents, Washington, D. C."